United States Patent
Farkash et al.

(10) Patent No.: US 12,254,110 B2
(45) Date of Patent: Mar. 18, 2025

(54) SEARCHING, MATCHING, AND MASKING OF COMPOSITE FORMATS

(71) Applicant: International Business Machines Corporation, Armonk, NY (US)

(72) Inventors: Ariel Farkash, Shimshit (IL); Micha Gideon Moffie, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 937 days.

(21) Appl. No.: 17/335,855

(22) Filed: Jun. 1, 2021

(65) Prior Publication Data

US 2022/0391529 A1 Dec. 8, 2022

(51) Int. Cl.
| | |
|---|---|
| *G06F 21/62* | (2013.01) |
| *G06F 16/2455* | (2019.01) |
| *G06F 16/25* | (2019.01) |
| *G06F 18/21* | (2023.01) |
| *G06F 21/60* | (2013.01) |
| *G06K 9/62* | (2022.01) |
| *G06N 20/00* | (2019.01) |

(52) U.S. Cl.
CPC ...... *G06F 21/6227* (2013.01); *G06F 16/2456* (2019.01); *G06F 16/258* (2019.01); *G06F 18/217* (2023.01); *G06F 21/602* (2013.01); *G06N 20/00* (2019.01)

(58) Field of Classification Search
CPC ............. G06F 21/6227; G06F 16/2456; G06F 16/258; G06F 18/217; G06F 21/602; G06F 21/6254; G06N 20/00
See application file for complete search history.

(56) References Cited

U.S. PATENT DOCUMENTS

| | | | |
|---|---|---|---|
| 10,339,038 B1* | 7/2019 | Singh | G06F 11/3688 |
| 10,902,013 B2* | 1/2021 | Lancaster | G06F 16/285 |
| 2015/0358159 A1* | 12/2015 | Rozenberg | H04L 9/0618 |
| | | | 380/28 |

(Continued)

OTHER PUBLICATIONS

A. Halaas, B. Svingen, M. Nedland, P. Saetrom, O. Snove and O. R. Birkeland, "A recursive MISD architecture for pattern matching," in IEEE Transactions on Very Large Scale Integration (VLSI) Systems, vol. 12, No. 7, pp. 727-734, Jul. 2004 (Year: 2004).*

(Continued)

*Primary Examiner* — Joseph P Hirl
*Assistant Examiner* — Thomas A Gyorfi
(74) *Attorney, Agent, or Firm* — David K. Mattheis

(57) ABSTRACT

An example system includes a processor to generate regular expressions representing textual pattern facets of sub-formats of a composite format, and a regular expression representing a composite textual pattern of the composite format based on sub-format and composition type. The processor can search the data using generated regular expression representing composite textual patterns to detect occurrences of candidate matches. The processor can recursively match and validate the detected occurrences with the composite format and hierarchically match and validate sub-formats in the detected occurrence. The processor can mask in place the detected occurrence of the composite format in the data using ranking-based integer format preserving masking.

20 Claims, 6 Drawing Sheets

(56) References Cited

U.S. PATENT DOCUMENTS

2017/0124166 A1* 5/2017 Thomas ................ H04L 69/08
2017/0337386 A1* 11/2017 Kumaresan ........... G06F 21/604
2018/0053008 A1 2/2018 Busch
2018/0241545 A1 8/2018 Murray
2021/0248154 A1* 8/2021 Wu .................. G06F 16/24578

OTHER PUBLICATIONS

"Common Operators" Article dated Jul. 13, 2001 as verified by the Internet Archive (7 pages) http://web.archive.org/web/20010713023438/ https://web.mit.edu/gnu/doc/html/regex_3.html (Year: 2001).*

Anonymous, "Instance based format preserving encryption and tokenization", An IP.com Prior Art Database Technical Disclosure, Nov. 30, 2015, 7 pages.

Mor Weiss et al., Practical Solutions for Format-Preserving Encryption, Jun. 2015, 10 pages.

Peter Mell, et al., The NIST Definition of Cloud Computing, Special Publication 800-145, Computer Security Division, Sep. 2011, 7 pages.

* cited by examiner

SEARCHING, MATCHING, AND MASKING OF COMPOSITE FORMATS

BACKGROUND

The present techniques relate to masking data. For example, masking data may include encrypting or tokenizing data. More specifically, the techniques relate to search and identify data that belongs to a format and masking the data while preserving the format of the data.

Search and identification of and masking may be generally handled by two different technologies. For example, search and identification may be performed in data classification systems by means of a regular-expressions on text, dictionaries, and hard coded restrictions. Format-preserving encryption or format-preserving tokenization may be separately handled using a rank-then-cipher approach. Format-preserving encryption refers to encrypting in such a way that an output ciphertext is in the same format as the input plaintext. Tokenization refers to the process of substituting a sensitive data element with a non-sensitive equivalent, referred to herein as a token, that has no extrinsic or exploitable meaning or value. The token is a reference or identifier that maps back to the sensitive data through a tokenization system. Format-preserving tokenization refers to a process in which the generated token is in the same format as the substituted element. A rank-then-cipher approach may include ranking strings into integers and performing integer format-preserving encryption. For example, a format F of size N is arbitrarily ordered as $F=\{s_0, \ldots, s_{N-1}\}$, and for a string s in format F, an index i such that $s=s_i$ is found; then i is encrypted into an index j, using an integer-FPE encryption algorithm. Finally, the encryption of s is the message $s_j$. Decryption may be performed in the same manner by replacing the integer-FPE encryption with the decryption algorithm.

However, data classification systems and masking systems working together may not be able to perform search and identification and masking together in a consistent fashion. For example, masking a format may result in search and identification not performing properly. In some cases, strings matched with a format may not always be able to undergo format-preserving masking.

SUMMARY

According to an embodiment described herein, a system can include processor to generate regular expressions representing textual pattern facets of sub-formats of a composite format, and a regular expression representing a composite textual pattern of the composite format based on sub-format and composition type. The processor can also further search the data using generated regular expression representing composite textual patterns to detect an occurrences of a candidate match. The processor can also recursively match and validate the detected occurrence with the composite format and hierarchically match and validate sub-formats in the detected occurrence. The processor can also mask in place the matched and validated occurrence of the composite format in the data using a rank-then-cipher based format preserving masking. Thus, the system may enable format preserving masking that is consistent with searching and matching of composite formats. Preferably, the composition format includes a number of sub-formats, wherein each of the number of sub-formats match, search, and rank themselves. In this embodiment, a ranking consistent with search and matching is enabled for a variety of formats. Optionally, the number of sub-formats includes a composite format and a building block. In this embodiment, nested formats are supported. Preferably, the composite format includes a hierarchical structure of the sub-formats. In this embodiment, the hierarchical structure of the sub-formats enables a composite ranking. Optionally, the composition format is a concatenation of sub-formats. In this embodiment, particular types of formats are enabled. Optionally, the composition format includes a union of sub-formats. In this embodiment, other types of formats are enabled. In this embodiment, other types of compositions are enabled. Optionally, the rank-then-cipher generates a format-preserved mask corresponding to an encrypted index value of a composite ranking of the matched and validated occurrence. In this embodiment, the format-preserved mask may be reversible using an encryption key. Optionally, the rank-then-cipher generates format-preserved mask corresponding to a tokenized index value of a composite ranking of the matched and validated occurrence. In this embodiment, the mask may be consistent but not reversible.

According to another embodiment described herein, a method can include receiving, via a processor, a composite format and data. The method can further include generating, via the processor, regular expressions representing textual pattern facets of sub-formats, and a regular expression representing a composite textual pattern of the composite format based on sub-format and composition type. The method can also further include searching, via the processor, the data using the generated regular expression representing the composite textual pattern to detect an occurrence of a candidate match. The method can also include recursively matching and validating, via the processor, the detected occurrence with the composite format and hierarchically matching and validating sub-formats in the detected occurrence. The method can also further include masking in place, via the processor, the matched and validated occurrence of the composite format in the data using a rank-then-cipher based format preserving masking. The method can also include outputting, via the processor, masked data. Thus, the method may enable format preserving masking that is consistent with searching and matching of composite formats. Preferably, generating the regular expressions includes mapping each sub-format to respective text using capturing groups. In this embodiment, the use of capturing groups enables decomposition into sub-formats. Optionally, recursively matching the detected occurrences with the composite format includes matching a nested composite format within the composite format. In this embodiment, nested formats are able to be supported. Optionally, matching the composite format includes decomposing the detected occurrence to a sub-format matching using capturing groups and calling a match on each of the sub-formats with their respective sub-strings. In this embodiment, individual sub-formats of a composite format are able to be matched. Optionally, validating the detected occurrences includes validating an additional format restriction not represented in the textual pattern facets and the composite textual pattern. In this embodiment, additional format restrictions, such as Luhn checksums, can be validated. Optionally, masking in place includes replacing the matched and validated occurrence of the composite format in the data with an encrypted value or a token. In this embodiment, the mask can be reversible if the mask is an encrypted value. Optionally, the rank-then-cipher based format preserving masking includes executing a composite ranking of the validated occurrence to generate an integer, executing an integer-encryption of the integer to generate an encrypted integer, and unranking the encrypted integer to generate a masked value for the validated occurrence. In this embodiment, a composite format can be returned to its original value using an encryption key. Optionally, the rank-then-cipher based format preserving masking includes a tokenization of the matched and validated occurrence. In this embodiment, the masking can be performed more efficiently. Optionally, the method includes validating a machine learning model using the output masked data as test data. In this embodiment, a machine learning model trained using the data can be efficiently validated using test data automatically generated by the method.

According to another embodiment described herein, a computer program product for masking composite formats can include computer-readable storage medium having program code embodied therewith. The computer readable storage medium is not a transitory signal per se. The program code executable by a processor to cause the processor to receive a composite format and data. The program code can also cause the processor to generate regular expressions representing textual pattern facets of sub-formats of a composite format, and a regular expression representing a composite textual pattern of the composite format based on sub-format and composition type. The program code can also cause the processor to search the data using generated regular expression representing composite textual patterns to detect an occurrence of a candidate match. The program code can also cause the processor to recursively match and validate the detected occurrence with the composite format and hierarchically match and validate sub-formats in the detected occurrence. The program code can also cause the processor to mask in place the matched and validated occurrence of the composite format in the data using a rank-and-cipher format preserving masking. The program code can also cause the processor to also further output masked data. Thus, the computer program product may enable format preserving masking that is consistent with searching and matching of composite formats. Optionally, the program code can also cause the processor to validate an additional format restriction not represented in the textual pattern facets and the composite textual pattern. In this embodiment, additional format restrictions, such as Luhn checksums, can be validated. Optionally, the program code can also cause the processor to map each sub-format to a respective text using capturing groups.

DETAILED DESCRIPTION

According to embodiments of the present disclosure, a system can include a processor to generate regular expressions representing textual pattern facets of sub-formats of a composite format, and a regular expression representing a composite textual pattern of the composite format based on sub-format and composition type. The processor can search the data using generated regular expression representing composite textual patterns to detect an occurrence of a candidate match. The processor can recursively match and validate the detected occurrence with the composite format and hierarchically match and validate sub-formats in the detected occurrence. The processor can then mask in place the matched and validated occurrence of the composite format in the data using ranking-based integer format preserving masking. As used herein, a format refers to a data type that has the properties of being able to match, search, and rank itself. A composite format, as used herein, refers to a format that is a combination of sub-formats that also has the properties of being able to match, search, and rank itself. Thus, embodiments of the present disclosure enable unbounded hierarchical user-defined composite formats that enable matching, searching and masking in a format preserving manner. The embodiments thus allow searching and matching to be performed consistently with format preserving masking, which may include format-preserving encryption or tokenization. For example, according to embodiments described herein, a string that is matched with a composite format will always be able to undergo a format-preserving masking. In addition, according to embodiments described herein, a format-preserving masked value will always be a positive match with the composite format. The consistency is a "compilation" time consistency that is built into the design of the system described herein. Therefore, using the embodiments described herein, no runtime validation is needed to ensure such consistency. Moreover, less errors may therefore be made using the embodiments described herein because of such consistency.

Figure 1:
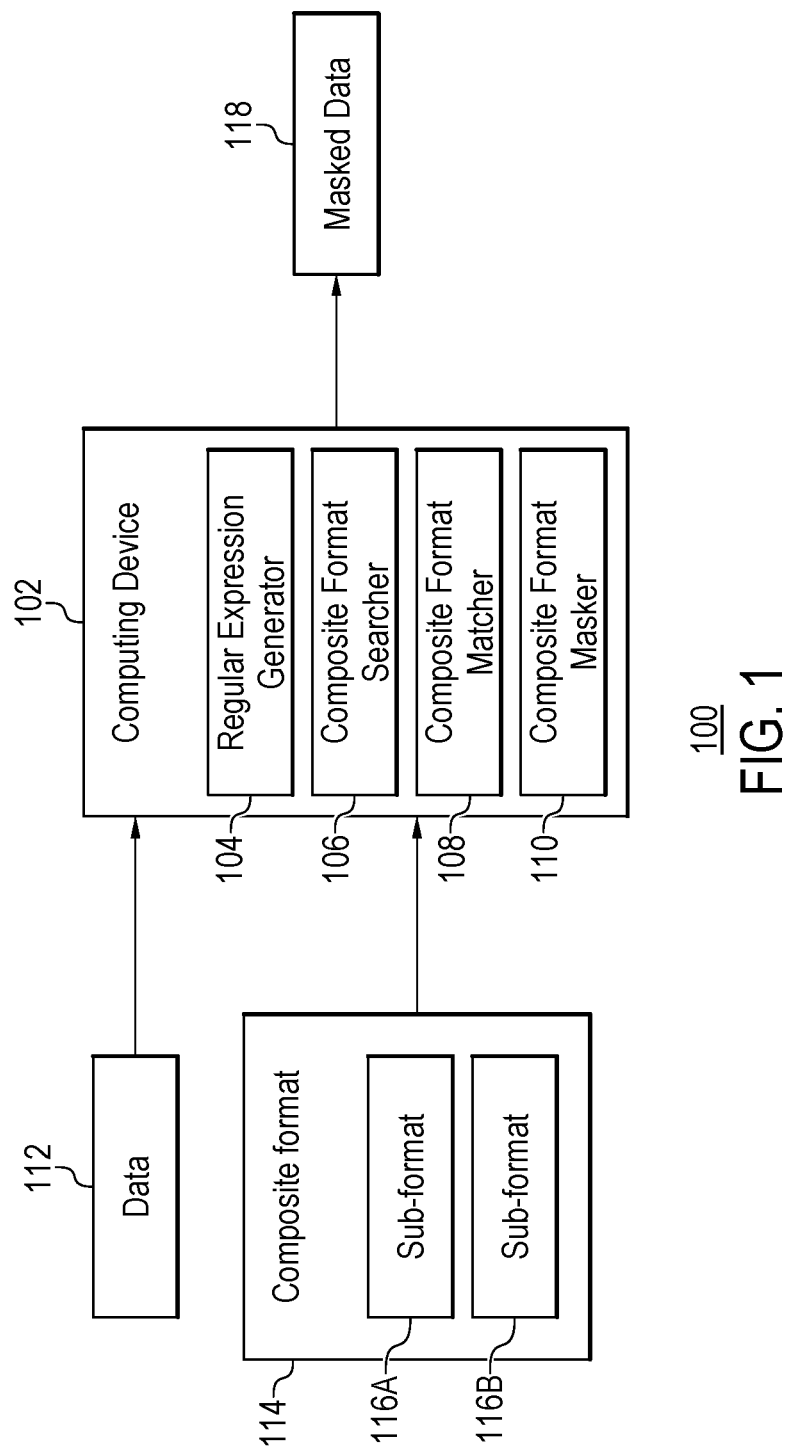
FIG. 1 is a block diagram of an example system for matching, searching, and masking composite formats.

With reference now to FIG. 1, a block diagram shows an example system for matching, searching, and masking composite formats. The example system is generally referred to by the reference number 100. FIG. 1 includes a computing device 102. As one example, the computing device 102 may be a cloud-based service that provides masking services for composite formats. The computing device 102 includes a regular expression generator 104, composite format searcher 106, a composite format matcher 108, and a composite format masker 110. The system 100 also includes data 112 and composite format 114 shown being received at the computing device 102. For example, the data 112 and composite format 114 may be received from another computing device (not shown). The composite format 114 includes sub-formats 116A and sub-format 116B. For example, the composite format 114 may be a concatenation or union of sub-formats 116A and 116B. The computing device 102 is also shown outputting masked data 118. For example, the masked data 118 may have one or more composite formats masked. In various examples, the masked data 118 may include portions of data that are encrypted or tokenized. For example, the encrypted or tokenized portions of masked data 118 may be any detected and validated occurrences of the composite format 114.

As shown in FIG. 1, the computing device 102 may be provided with data 112 and composite format 114 and output masked data 118, in which any occurrences of the composite format 114 in the data 112 is masked. For example, the data 112 may include text corresponding to a composite format 114 to be searched and masked. In various examples, the sub-formats 116A and 116B of the composite format 114 may be any combination of building blocks or composite formats composed of additional sub-formats (not shown). As used herein, a building block refers to a format building block that is combinable with one or more other sub-formats via compositions to form a composite format 114. In various examples, a building block may be in the form of an Integer[Min,Max], FixedLengthPaddedInteger[Min, Max, Length], RealNumber[Min, Max, Precision], FixedLengthString[Alphabet, Length], VariableLengthString[Alphabet, MinLen, MaxLen], a RegularExpression format, or a StringSet format. A set of example building block types with respective example values are shown in Table 1 below:

TABLE 1

Example Building Block Types and Instances

| Building Block Types | Example Instances |
|---|---|
| Integer[Min, Max] | 134 |
| FixedLengthPaddedInteger[Min, Max, Length] | 0012 |
| RealNumber[Min, Max, Precision] | 23.45 |
| FixedLengthString[Alphabet, Length] | ABCDE, abcde |
| VariableLengthString[Alphabet, MinLen, MaxLen] | ABC, ABCD, abcde |
| RegularExpression | \d{2, 5}\.[A-Z]{3} |
| StringSet | [David, Jason, Michael] |

In various examples, the composite format 114 may be any suitable combination of sub-formats that can search, match, and rank themselves. For example, the combination of sub-formats may be a concatenation of sub-formats 116A and 116B. A concatenation, as used herein, is a series of formats linked together. For example, the composite format CUST001 is an instance of a concatenation type composite format that includes two sub-formats: a CUST fixed string and an Integer range [1-700]. In some examples, the combination of sub-formats may be a concatenation or a union of sub-formats 116A and 116B. A union, as used herein, is a combination of interchangeable sub-formats. For example, the integer ranges format of [1-200, 300-500, 700-950] is an example union of three integer ranges that can be used interchangeably. In various examples, to enable each of the building blocks to search, match, and rank themselves, a textual pattern facet of each building block is implemented as a regular expression automatically generated by the regular expression generator 104. A regular expression is a sequence of characters that specifies a search pattern. As one example, the textual pattern facet of [0-27] may be represented using the regular expression: (?:1?[0-9])|2[0-7]). In addition, the composite format 114 can also search, match, and rank itself. In order to enable the composite format 114 to search, match, and rank itself, the composite textual patterns of the composite format 114 are implemented as a regular expression automatically generated by the regular expression generator 104 based on its sub-formats and composition type. For example, the composite textual pattern may be a regular expression representing a hierarchical structure of sub-formats represented as regular expressions. For example, the composite textual pattern [0-27, 80-89] may be represented using the regular expression: (?:1?[0-9])|2[0-7])|(?:8[0-9]). In this manner, the composite formats 114 may be able to map each part of an input string from data 112 to its corresponding sub-format for computing a composite ranking and unranking based on their sub-formats, as well as performing any additional validations. For example, the composite format 114 may be able to map a value of 26 to the first range or the value 82 to the second range of the composite textual pattern [0-27, 80-89]. Because validations may be performed at any level of the hierarchy, any such validation may rely on the mapping of the value in order to determine whether the value is to be validated. In addition, the mapping may be used to perform nested validations in which a sub-format is validated before a composite format is also validated.

In various examples, the composite format searcher 106 can search for occurrences of a composite format in the data 112. For example, given a text in the data 112, the composite format searcher 106 can detect occurrences of candidate matches of the composite format 114 in the text. The occurrences of candidate matches may be strings of text in the data 112 that match the composite textual pattern of the composite format 114. The composite format searcher 106 can then call a match( ) method on each of the detected occurrences of candidate matches. For example, the match( ) method may be executed by the composite format matcher 108.

In various examples, given a string in data 112, the composite format matcher 108 can return a Boolean yes if the string is a legal string in the composite format 114. For example, the given string may be a detected occurrence of a candidate match with the composite format 114 from the composite format searcher 106. In various examples, the regular expression generator 104 may first generate a regular expression that is the text pattern for the composition at hand. For example, given a concatenation type composite format 114, the regular expression generator 104 can perform a concatenation of regular expressions of each sub-format to create the overall regular expression. The regular expression generator 104 can also recursively generate the regular expression of each sub-format. In some examples, to map each sub-format to its respective text, the regular expression generator 104 can keep sub-formats in capturing groups. For example, the regular expression generator 104 can use parentheses to group regular expressions between the parentheses. The parentheses may thus be used to capture the text matched by the regular expression inside them into a numbered group that can be reused with a numbered backreference. The numbered backreferences may be used to map the regular expressions of each grouped sub-format to the respective text. In various examples, the composite format matcher 108 can then run a regular expression match on given string against the regular expressions generated for the composite format 114, and return false if it does not match. In various examples, if the initial match returns true, then the composite format matcher 108 can also perform additional validation on the given string. For example, the composite format matcher 106 can also validate additional format restrictions not covered in the string pattern facets of building blocks or the composite textual pattern of a composite format 114. As one specific example, the composite format matcher 108 can perform a Luhn checksum validation using the Luhn algorithm. Another example is the composite format of International Standard Booking Number, or ISBN, that can be 10 or 13 digits, and has a last character that is a mod11 checksum, with X in case mod11 being equal to 10. In various examples, the composite format matcher 108 can decompose the given string to its sub-format matching using the capturing groups and call a match on each sub-format with the respective sub-string. If any of the matching of the sub-formats fails, then the composite format matcher 108 may return a value of false. Otherwise, the composite format matcher 108 may return a value of true indicating that the given string matches the composite format 114, as well as any additional validations that may have been performed. In this manner, the composite format matcher 108 can validate both sub-formats as well as the format composition of the detected occurrences of a composite format 114.

Still referring to FIG. 1, given one or more validated legal strings of the composite format 114, the composite format masker 110 can mask such validated occurrences of composite formats 114 in the data 112 to generate masked data 118. In various examples, the composite format masker 110 can use a composite rank-then-cipher in order to mask the validated occurrences of composite format 114. For example, a composite rank-then-cipher may include ranking strings of the data 112 into integers and performing an integer format-preserving encryption (FPE). In the composite rank-then-cipher approach, strings may be encrypted in three steps, referred to herein as ranking, integer-format-preserving-encryption, and unranking. In various examples, for the ranking of a string s, an index i such that $s=s_i$ may be found. For example, the composite format masker 110 can first produce a unique and consistent integer bound by the size of the domain of the composite format 114. For example, if 100 possible values exist for a given composite format 114, then the composite format masker 110 can generate a unique integer value for the specific string formatted in the composite format 114 from 1-100. In various examples, the composite format masker 110 can thus use the hierarchical structure of the composite format in order to parse the composite format 114 and determine a ranking for each sub-format and a relative ranking of the sub-formats to rank all possible combinations of the composite format 114. Then, in some examples, the composite format masker 110 can execute an integer-encryption by encrypting index i into an index j, using an integer-FPE algorithm. In these examples, the cipher may be an encryption that is provided an integer i from the domain d [0,d.size), and returns an integer j in [0,d.size), that is only reversible using the encryption key. In various examples, the cipher operation may be a tokenization. For example, in a tokenization, the operation used to encrypt the integer may be a secure hash function, such as SHA-3. Thus, the given an integer i from the domain d [0,d.size), the tokenization may return an integer j in [0,d.size), that is consistent but not reversible. Finally, the unranking is performed to generate the encryption of s, which is the string $s_j$. In various examples, decryption may be performed in the same manner by replacing the integer-FPE encryption with the decryption algorithm. In some examples, the building blocks Integer [Min,Max], FixedLengthPaddedInteger[Min, Max, Length], and RealNumber[Min, Max, Precision], may be ranked using an integer domain ranking algorithm. The building blocks FixedLengthString[Alphabet, Length] and VariableLengthString[Alphabet, MinLen, MaxLen] may be ranked using a lexicographic ranking algorithm. The building block RegularExpression may be ranked using a state machine. The building block StringSet may be ranked using an enumeration ranking algorithm. When the cipher operation is reversible, such as in encryption, the rank-and-cipher process is also reversible. Thus, given an integer of a particular composite format 114, a composite format unmasker (not shown) may reproduce the original string from data 112 that was masked in masked data 118.

In one specific example, an automated generation of a regular expression is described for a concatenation type composite format defined for an IPv4 format definition. For example, the IPv4 format may be defined as:

```
{
  "type" : "Concatenation",
  "configuration": {
    "subformats": [
      {"type": "Integer", "configuration": {"min": 1, "max": 255} },
      {"type": "FixedLengthString", "configuration":
      {"alphabet": ["."], "length": 1}},
      {"type": "Integer", "configuration": {"min": 0, "max": 255} },
      {"type": "FixedLengthString", "configuration
      {"alphabet": ["."], "length": 1}},
      {"type": "Integer", "configuration": {"min": 0, "max": 255} },
      {"type": "FixedLengthString", "configuration":
      {"alphabet": ["."], "length": 1}},
      {"type": "Integer", "configuration": {"min": 0, "max": 255} },
    ]
  }
}
```

In various examples, the regular expression generator 104 can generate a regular expression for the textual pattern facets and composite textual pattern for the IPv4 format automatically based on the IPv4 format definition provided above. For example, the IPv4 construct may be converted into a Java class, and the Java class can create an appropriate regular expression. A regular expression may be generated for each sub-format recursively. Then, the regular expression generator 104 may build the composition recursively until an entire composite textual pattern is formed. For example, the regular expression generator 104 can generate regular expressions corresponding to leaves of a hierarchical tree structure first, and then the regular expression generator 104 can build a composite textual pattern by reclusively climbing the tree to the top of the tree. The IPv4 composite format may therefore have its own unique manifestation as a regular expression. In the example case of the IPv4 format, this regular expression would be: (((?:[1-9]|[1-9][0-9]{1}| [1-1][0-9]{2}|2[0-4][0-9]{1}|25[0-5]))((?:[\.]{1}))((?:[0-9]| [1-9][0-9]{1}|[1-1][0-9]{2}|2[0-4][0-9]{1}|25[0-5]))((?:[\.] {1}))((?:[0-9]|[1-9][0-9]{1}|[1-1][0-9]{2}|2[0-4][0-9] {1}|25[0-5]))((?:[\.]{1}))((?:[0-9]|[1-9][0-9]{1}|[1-1][0-9] {2}|2[0-4][0-9]{1}|25[0-5]))). The composite format searcher 106 detect occurrences of candidate matches in a string using the regular expression representing the composite textual pattern of the IPv4 composite format. For example, the composite format searcher 106 may detect that the IP address 192.168.1.1 matches composite textual pattern. The IPv4 composite textual pattern implemented as a regular expression may then also be used by the composite format matcher 108 to recursively match the detected occurrences of candidate matches of the IPv4 format in strings of data. For example, the composite format matcher 108 can match the composite regular expression with an occurrence to confirm a match. In addition, the composite format matcher 106 can decompose the regular expression into regular expressions corresponding to the sub-formats of the IPv4 composite format that are also used to confirm a match. For example, the composite format matcher 108 can perform such decomposition using capturing groups as specified in the composite format, as in the example above. Then, the composite format matcher 108 can perform recursive validation on the whole tree corresponding to the hierarchical structure of the IPv4 composite format. In various examples, the composite format matcher 108 may also perform any additional validations at any level of the hierarchy after confirming a match. However, in the IPv4 format, no such additional validations exist, therefore in this example no additional validations are performed by the composite format matcher 108. Thus, as one example, the composite format masker 110 can mask the IPv4 address 192.168.1.1 with another IPv4 address of 1.2.3.4. For example, the composite format masker 110 can rank the IPv4 address 192.168.1.1 to determine its index and then apply encryption to the index to generate a second index. The composite format masker 110 can then determine an IPv4 address that corresponds to the second index. In the example of IPv4, the IPv4 address 192.168.1.1 may be ranked in relation to the 4,278,190,080 possible values in the IPv4 domain and the index encrypted into a second index with a value within the range 0-4,278,190,079. In this example, the composite format masker 110 can translate the value of the second encrypted index to the IPv4 address of 1.2.3.4 and mask the original IPv4 address 192.168.1.1. Because the new IPv4 address 1.2.3.4 has its format preserved, the functionality of the original data with the newly masked address may be unaffected.

Another example including an additional set of nested validations may be a proprietary purchase ID. In this example, the proprietary purchase ID may be a concatenation type composite format in the regular expression form: Concat["AB",mod97,Products,PurchaseID]. In this examples, the format includes a prefix AB, followed by a validation mod97, followed by a Product sub-format, and a PurchaseID sub-format. The Product sub-format may be a union type composite format expressed as Products=Union ["Product1", "Product2", "Product3", . . . , "ProductN"]. The PurchaseID sub-format may be PurchaseID that may include, for example, a mod11 validation integer at the end. Thus, the PurchaseID may include a nested validation. In various examples, the embodiments described herein may be used to hierarchically both match and validate a detected candidate occurrence of the proprietary PurchaseID. In some examples, the detected candidate occurrence may have been returned by a search performed using a textual pattern facet corresponding to the composite textual pattern, for example: ((((?:\QAB\E))((?:\d{2}))((?:\d{6}))((?:\d{13})))). The detected occurrence may then be recursively matched and validated. For example, the PurchaseID with the nested validation may be matched and validated first. In response to validating the PurchaseID sub-format using mod11, then the other sub-formats are matched and validated as well. For example, the Product sub-format may be matched against the Union type composite format for the sub-format. Finally, the mod97 validation may also be performed against the entire composite proprietary purchase ID itself. In response to matching and validating the composite proprietary purchase ID, the composite format masker 110 may mask the matched and validated occurrence in place. For example, the composite format masker 110 may use the rank-then-cipher approach described above to replace the occurrence in the data 112 with a mask, such as an encrypted value or a token.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional composite formats, sub-formats, additional validations, or additional computing devices, etc.).

Figure 2:
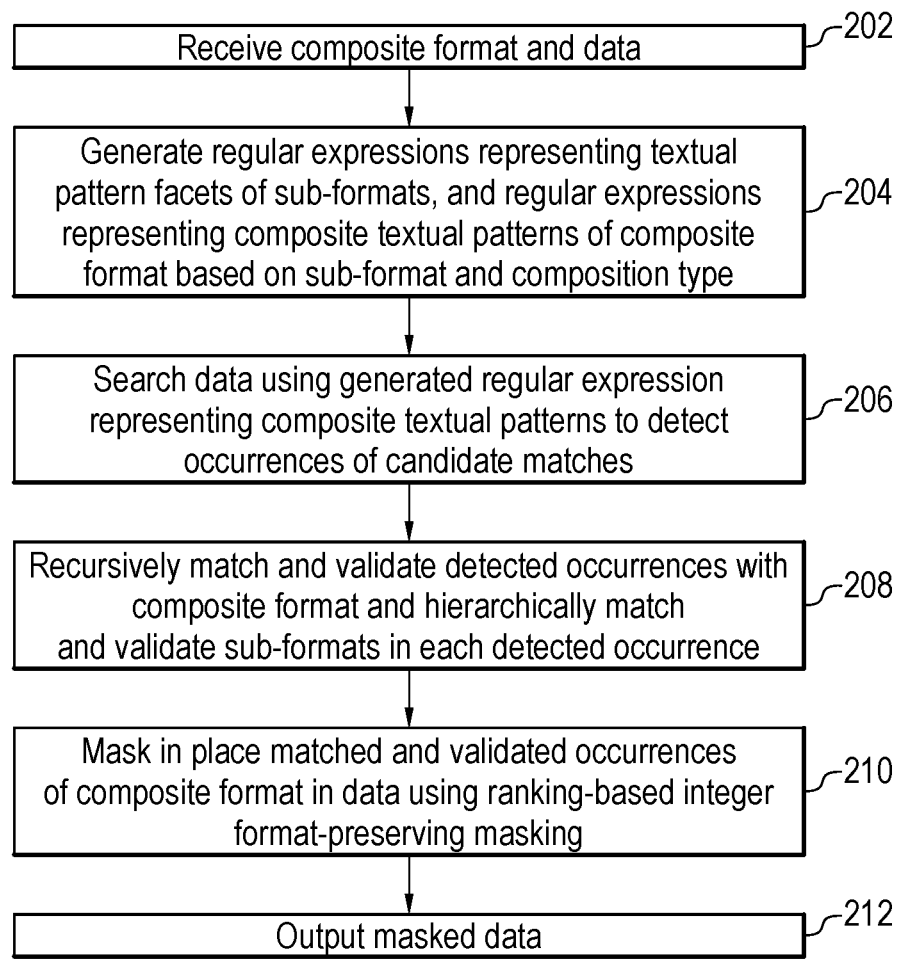
FIG. 2 is a block diagram of an example method that can match, search, and mask composite formats.

FIG. 2 is a process flow diagram of an example method that can match, search, and mask composite formats. The method 200 can be implemented with any suitable computing device, such as the computing device 300 of FIG. 3 and is described with reference to the systems 100 of FIG. 1. For example, the methods described below can be implemented by the computing device 300 or computer-readable media 600 of FIGS. 3 and 6, respectively.

At block 202, a composite format and data are received. For example, the composite format may be a concatenation type composite format or a union type composite format. In some example, the composite format may include one or more nested composite formats. In various examples, the data may be text including one or more occurrences of composite formats to be masked.

At block 204, regular expressions representing textual pattern facets of sub-formats are generated, and regular expressions representing a composite textual pattern of the composite format based on sub-format and composition type are generated. For example, the composite textual pattern may represent a hierarchical structure of the sub-formats of a composite format.

At block 206, data is searched using generated regular expression representing composite textual patterns to detect occurrences of candidate matches. For example, the data may be text that is parsed in order to detect the composite textual patterns.

At block 208, detected occurrences are recursively matched with the composite format and validated, and sub-formats in each detected occurrence are hierarchically matched and validated. For example, recursively matching the detected occurrences may include decomposing the detected occurrence to a sub-format matching using capturing groups and calling a match on each of the sub-formats with their respective sub-strings. In some examples, a nested composite format within the composite format may be matched. In some examples, a Boolean yes may be returned if the detected occurrence is a legal string in the composite format. In some examples, validating the occurrences may include validating additional format restrictions not represented in the textual pattern facets and the composite textual patterns.

At block 210, matched and validated occurrences of the composite format in the data are masked in place using ranking-based integer format preserving masking. For example, the matched and validated occurrences of the composite format in the data may be replaced in the data with an encrypted value or a token. In various examples, the detected occurrence may be ranked using a composite rank-then-cipher. For example, the composite rank-then-cipher may replace detected occurrences with format-preserved values that corresponds to an encrypted index of a composite ranking. In various examples, the composite rank-then-cipher includes executing a composite ranking of the validated occurrence to generate an integer. For example, the integer may indicate a ranking of the occurrence of the composite format with respect to all possible instances of the composite format. The composite rank-then-cipher includes executing an integer-encryption of the integer to generate an encrypted integer. For example, the encrypted integer may correspond to an index of different instance of the composite format. The composite rank-then-cipher also includes unranking the encrypted integer to generate a masked value for the validated occurrence. In some examples, the rank-then-cipher based format preserving masking may include a tokenization of the matched and validated occurrence. For example, the integer may indicate a ranking of the occurrence of the composite format with respect to all possible instances of the composite format. In some examples, the composite rank-then-cipher includes executing an integer-tokenization. For example, the integer-tokenization may be based on a hash function of the integer to generate a tokenized integer. In various examples, the tokenized integer may correspond to an index of a different instance of the composite format. The composite rank-then-cipher also includes unranking the tokenized integer to generate a masked value for the validated occurrence.

At block 212, masked data is output. In some examples, the masked data may be output for various uses, such in a machine learning training to use as test data. For example, a machine learning model may be trained using the data and the output masked data may be used as test data to evaluate the performance of the trained machine learning model.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
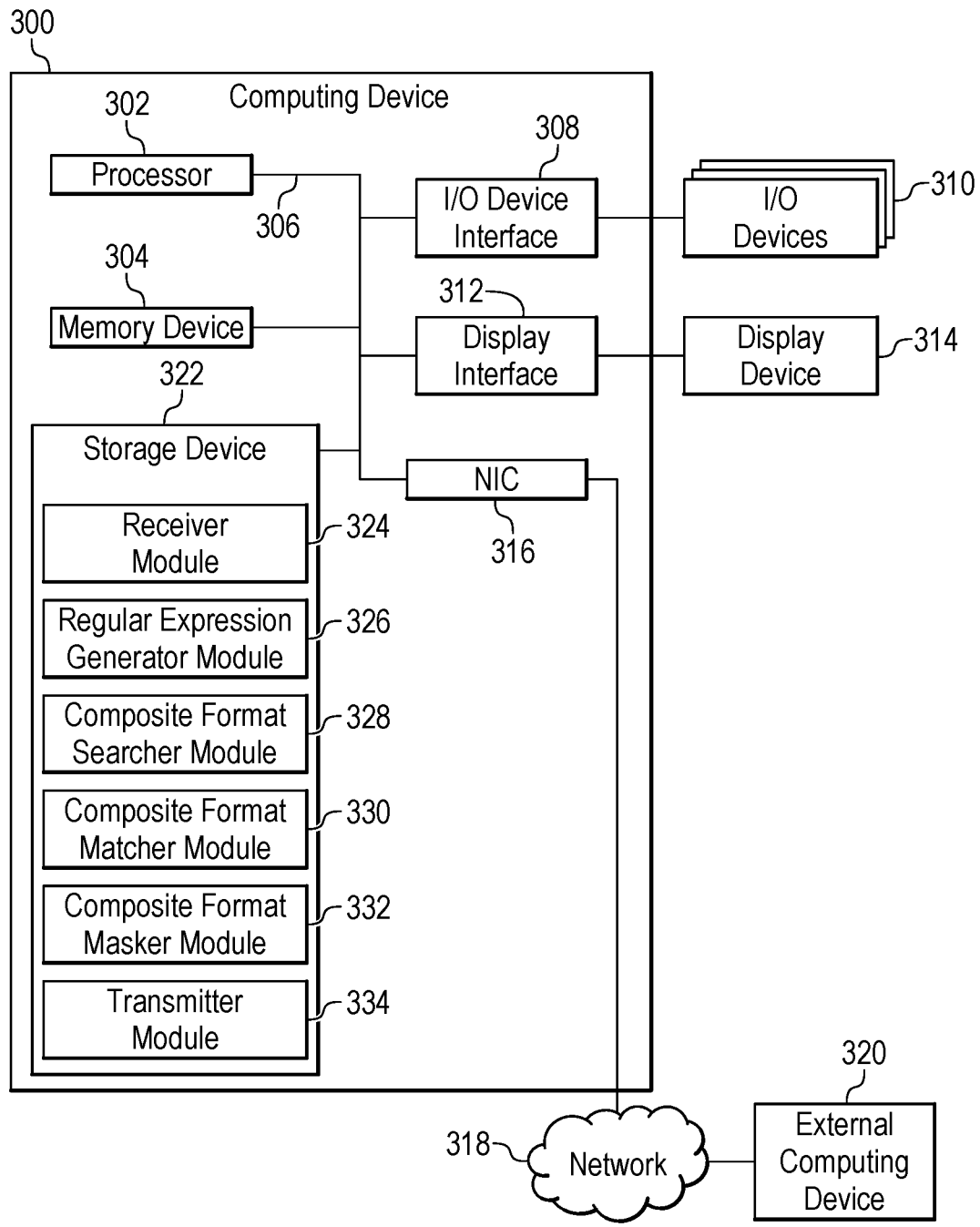
FIG. 3 is a block diagram of an example computing device that can match, search, and mask composite formats.

FIG. 3 is block diagram of an example computing device that can match, search, and mask composite formats. The computing device 300 may be for example, a server, desktop computer, laptop computer, tablet computer, or smartphone. In some examples, computing device 300 may be a cloud computing node. Computing device 300 may be described in the general context of computer system executable instructions, such as program modules, being executed by a computer system. Generally, program modules may include routines, programs, objects, components, logic, data structures, and so on that perform particular tasks or implement particular abstract data types. Computing device 300 may be practiced in distributed cloud computing environments where tasks are performed by remote processing devices that are linked through a communications network. In a distributed cloud computing environment, program modules may be located in both local and remote computer system storage media including memory storage devices.

The computing device 300 may include a processor 302 that is to execute stored instructions, a memory device 304 to provide temporary memory space for operations of said instructions during operation. The processor can be a single-core processor, multi-core processor, computing cluster, or any number of other configurations. The memory 304 can include random access memory (RAM), read only memory, flash memory, or any other suitable memory systems.

The processor 302 may be connected through a system interconnect 306 (e.g., PCI®, PCI-Express®, etc.) to an input/output (I/O) device interface 308 adapted to connect the computing device 300 to one or more I/O devices 310. The I/O devices 310 may include, for example, a keyboard and a pointing device, wherein the pointing device may include a touchpad or a touchscreen, among others. The I/O devices 310 may be built-in components of the computing device 300, or may be devices that are externally connected to the computing device 300.

The processor 302 may also be linked through the system interconnect 306 to a display interface 312 adapted to connect the computing device 300 to a display device 314. The display device 314 may include a display screen that is a built-in component of the computing device 300. The display device 314 may also include a computer monitor, television, or projector, among others, that is externally connected to the computing device 300. In addition, a network interface controller (NIC) 316 may be adapted to connect the computing device 300 through the system interconnect 306 to the network 318. In some embodiments, the NIC 316 can transmit data using any suitable interface or protocol, such as the internet small computer system interface, among others. The network 318 may be a cellular network, a radio network, a wide area network (WAN), a local area network (LAN), or the Internet, among others. An external computing device 320 may connect to the computing device 300 through the network 318. In some examples, external computing device 320 may be an external webserver 320. In some examples, external computing device 320 may be a cloud computing node.

The processor 302 may also be linked through the system interconnect 306 to a storage device 322 that can include a hard drive, an optical drive, a USB flash drive, an array of drives, or any combinations thereof. In some examples, the storage device may include a receiver module 324, a regular expression generator module 326, a composite format searcher module 328, a composite format matcher module 330, a composite format masker module 332, and a transmitter module 334. The receiver module 324 can receive a composite format and data. For example, the composite format may include a number of sub-formats that can each match, search, and rank themselves. In some examples, the sub-formats may be building blocks or composite formats themselves. For example, the composite format may include one or more nested composite format sub-formats. In various examples, the composite format may be concatenation of sub-formats. In some examples, the composite format may be a union of sub-formats. In some examples, the composite format may be a concatenation type composite format or a union type composite format. In some examples, the composite format may be a hierarchical structure of the sub-formats. The regular expression generator module 326 can generate regular expressions representing textual pattern facets of sub-formats of composite formats, and regular expressions representing composite textual patterns of the composite formats based on sub-format and composition type. The composite format searcher module 328 can search the data using generated regular expression representing composite textual patterns to detect occurrences of matches. The composite format matcher module 330 can recursively match and validate the detected occurrence with the composite format and hierarchically matching and validating sub-formats in the detected occurrence. The composite format masker module 332 can mask in place the matched and validated occurrence of the composite format in the data using ranking-based integer format preserving masking. In various examples, the validated occurrences may be masked using encryption or tokenization. For example, the ranking-based integer format preserving masking may be a composite rank-then-cipher that generates format-preserved encrypted value corresponding to encrypted index value of a composite ranking of the matched and validated occurrences. In some examples, the rank-then-cipher may use a token used to mask the matched and validated occurrence. For example, the ranking-based integer format preserving masking may be a composite rank-then-cipher that generates a format-preserved mask corresponding to a tokenized index value of a composite ranking of the matched and validated occurrence. The transmitter module 334 can output masked data. For example, the masked data may have validated occurrences of composite formats masked. In some examples, the transmitter module 334 can output the masked data to the external computing device 320 to train a machine learning model using the masked data as test data.

It is to be understood that the block diagram of FIG. 3 is not intended to indicate that the computing device 300 is to include all of the components shown in FIG. 3. Rather, the computing device 300 can include fewer or additional components not illustrated in FIG. 3 (e.g., additional memory components, embedded controllers, modules, additional network interfaces, etc.). Furthermore, any of the functionalities of the receiver 324, the regular expression generator module 326, the composite format searcher module 328, the composite format matcher module 330, the composite format masker module 332, and the transmitter module 334, may be partially, or entirely, implemented in hardware and/or in the processor 302. For example, the functionality may be implemented with an application specific integrated circuit, logic implemented in an embedded controller, or in logic implemented in the processor 302, among others. In some embodiments, the functionalities of the receiver 324, the regular expression generator module 326, the composite format searcher module 328, the composite format matcher module 330, the composite format masker module 332, and the transmitter module 334 can be implemented with logic, wherein the logic, as referred to herein, can include any suitable hardware (e.g., a processor, among others), software (e.g., an application, among others), firmware, or any suitable combination of hardware, software, and firmware.

Figure 4:
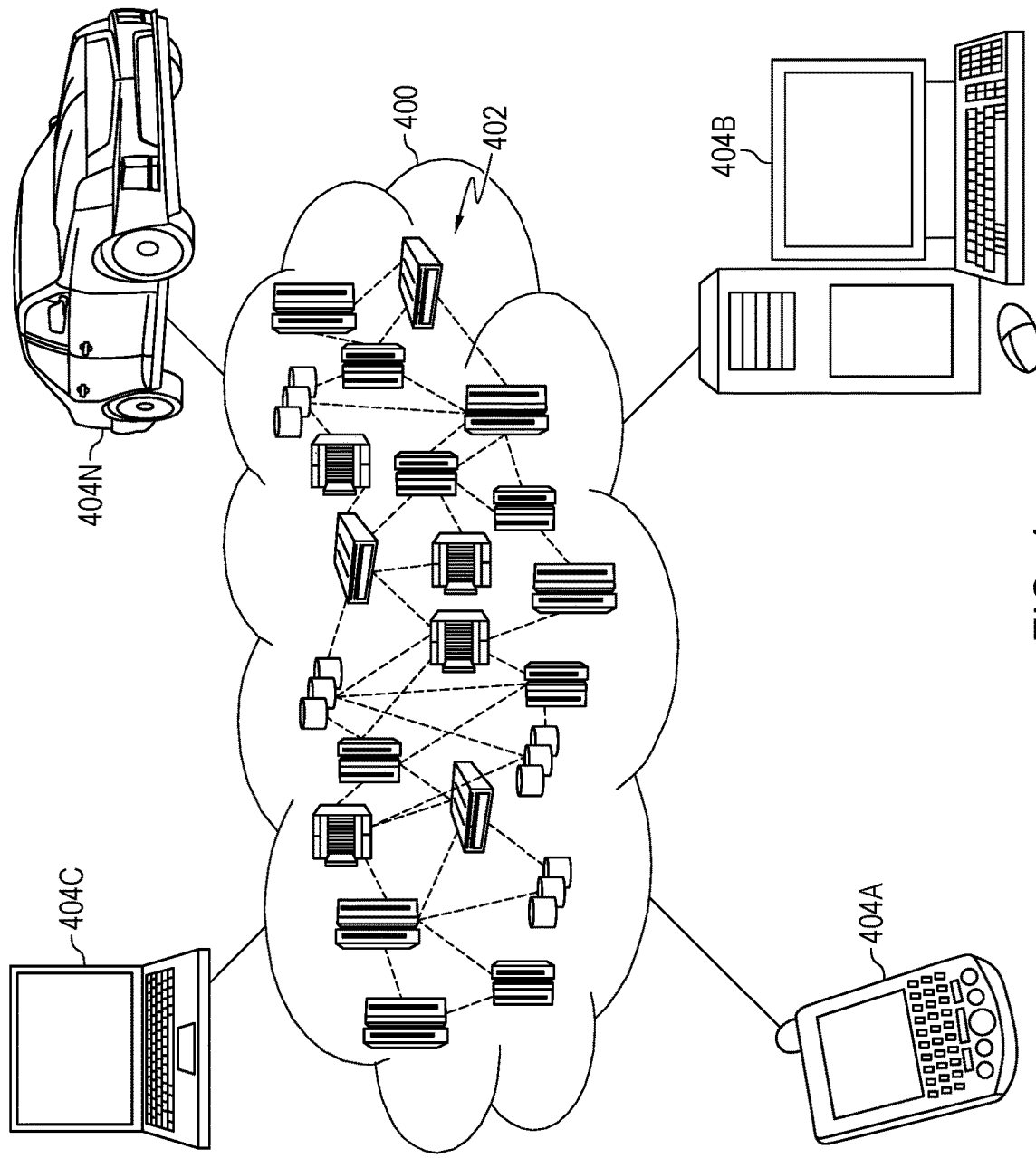
FIG. 4 is a diagram of an example cloud computing environment according to embodiments described herein.

Referring now to FIG. 4, illustrative cloud computing environment 400 is depicted. As shown, cloud computing environment 400 includes one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. Nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that computing nodes 402 and cloud computing environment 400 can communicate with any type of computerized device over any type of network and/or network addressable connection (e.g., using a web browser).

Figure 5:
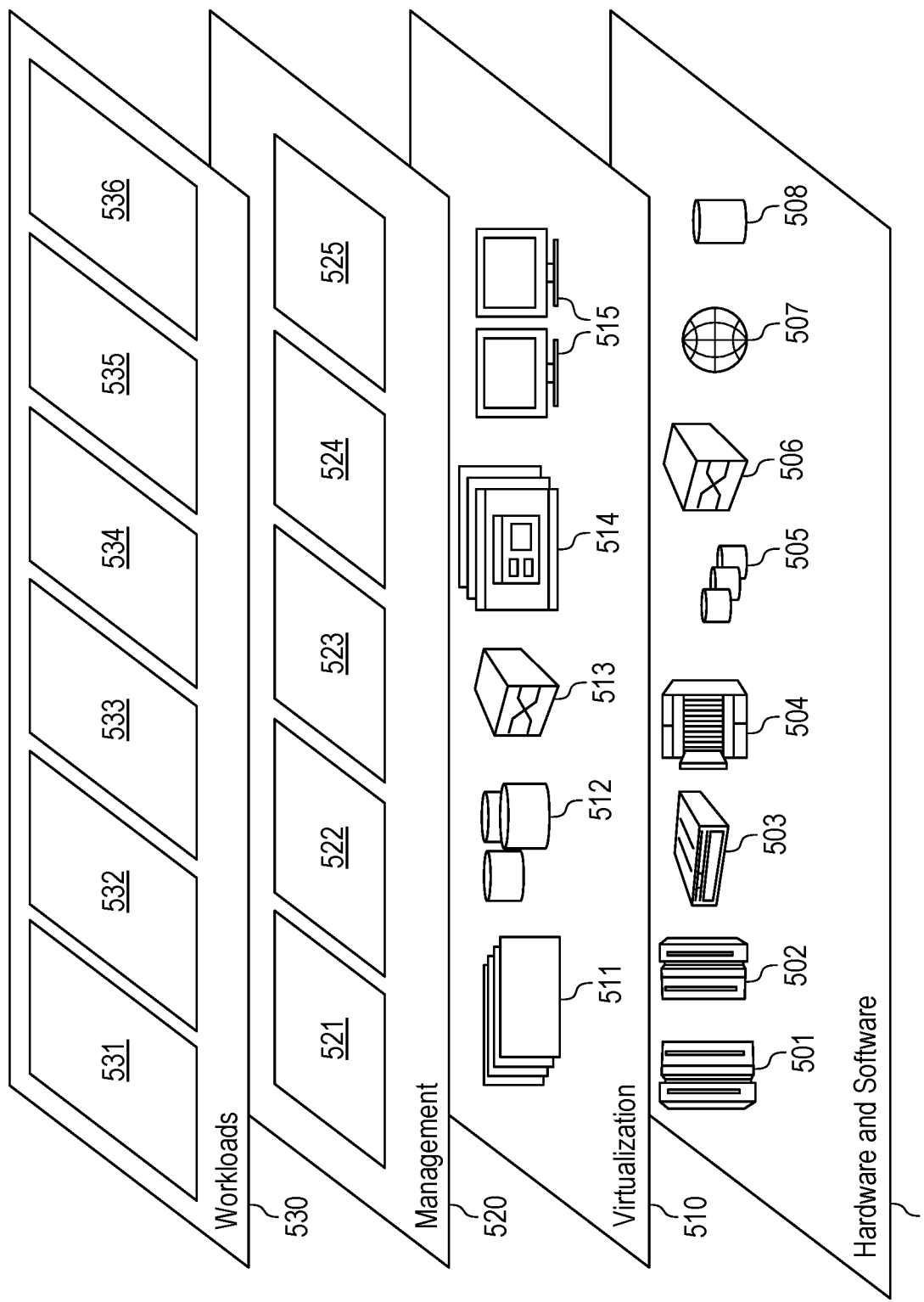
FIG. 5 is a diagram of an example abstraction model layers according to embodiments described herein.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 500 includes hardware and software components. Examples of hardware components include: mainframes 501; RISC (Reduced Instruction Set Computer) architecture based servers 502; servers 503; blade servers 504; storage devices 505; and networks and networking components 506. In some embodiments, software components include network application server software 507 and database software 508.

Virtualization layer 510 provides an abstraction layer from which the following examples of virtual entities may be provided: virtual servers 511; virtual storage 512; virtual networks 513, including virtual private networks; virtual applications and operating systems 514; and virtual clients 515.

In one example, management layer 520 may provide the functions described below. Resource provisioning 521 provides dynamic procurement of computing resources and other resources that are utilized to perform tasks within the cloud computing environment. Metering and Pricing 522 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 523 provides access to the cloud computing environment for consumers and system administrators. Service level management 524 provides cloud computing resource allocation and management such that required service levels are met. Service Level Agreement (SLA) planning and fulfillment 525 provide pre-arrangement for, and procurement of, cloud computing resources for which a future requirement is anticipated in accordance with an SLA.

Workloads layer 530 provides examples of functionality for which the cloud computing environment may be utilized. Examples of workloads and functions which may be provided from this layer include: mapping and navigation 531; software development and lifecycle management 532; virtual classroom education delivery 533; data analytics processing 534; transaction processing 535; and composite format matching, searching, and masking 536.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
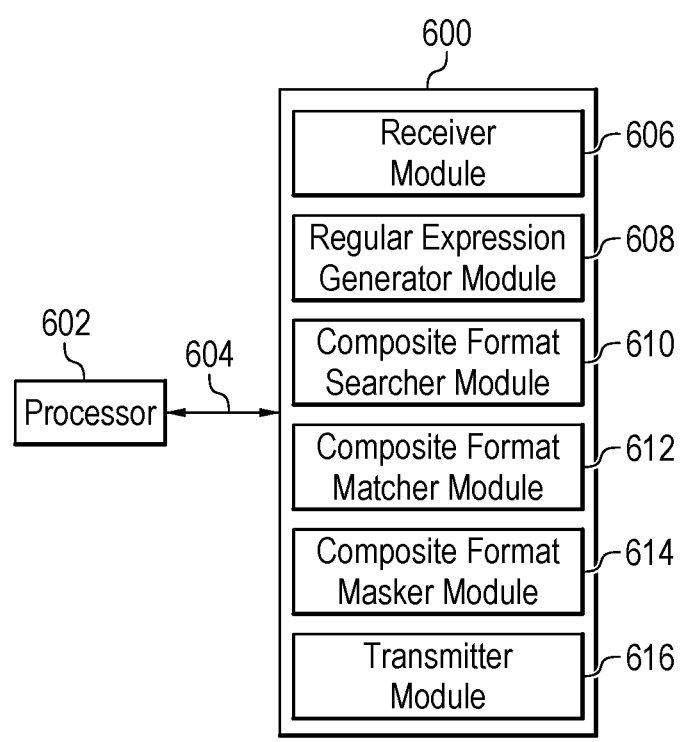
FIG. 6 is an example tangible, non-transitory computer-readable medium that can match, search, and mask composite formats.

Referring now to FIG. 6, a block diagram is depicted of an example tangible, non-transitory computer-readable medium 600 that can match, search, and mask composite formats. The tangible, non-transitory, computer-readable medium 600 may be accessed by a processor 602 over a computer interconnect 604. Furthermore, the tangible, non-transitory, computer-readable medium 600 may include code to direct the processor 602 to perform the operations of the method 200 of FIG. 2.

The various software components discussed herein may be stored on the tangible, non-transitory, computer-readable medium 600, as indicated in FIG. 6. For example, a receiver module 606 includes code to receive a composite format and data. A regular expression generator module 608 includes code to generate regular expressions representing textual pattern facets of sub-formats of a composite format, and a regular expression representing a composite textual pattern of the composite format based on sub-format and composition type. In some examples, the regular expression generator module 608 includes code to map each sub-format to a respective text using capturing groups. A composite format searcher module 610 includes code to search the data using generated regular expression representing composite textual patterns to detect an occurrence of candidate matches. A composite format matcher module 612 includes code to recursively match and validate the detected occurrences with the composite format and hierarchically match and validate sub-formats in the detected occurrences. In various examples, the composite format matcher module 612 includes code to match a nested composite format within the composite format. In some examples, the composite format matcher module 612 includes code to decompose the detected occurrences to a sub-format matching using capturing groups and call a match on each of the sub-formats with their respective sub-strings. In some examples, the composite format matcher module 612 includes code to validate an additional format restriction not represented in the textual pattern facets and the composite textual pattern. A composite format masker module 614 includes code to mask in place the matched and validated occurrence of the composite format in the data using a rank-and-cipher format preserving masking. For example, the composite format masker module 614 includes code to rank and mask the detected occurrence using a composite rank-then-cipher that includes a ranking of the validated occurrence to generate an integer, an integer-encryption of the integer to generate an encrypted integer, and an unranking of the encrypted integer to generate a masked value for the validated occurrence. A transmitter module 616 includes code to output masked data. In some examples, the output masked data may be used to train a machine learning model using the output masked data as test data to validate the trained machine learning model.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 6 may be included within the tangible, non-transitory, computer-readable medium 600, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
generate regular expressions representing textual pattern facets of sub-formats of a composite format, and a regular expression representing a composite textual pattern of the composite format based on sub-format and composition type;
search data using the generated regular expressions representing composite textual patterns to detect an occurrence of a candidate match;
recursively match and validate the detected occurrence with the composite format and hierarchically match and validate sub-formats in the detected occurrence; and
mask in place the matched and validated occurrence of the composite format in the data using a rank-then-cipher based format preserving masking.

2. The system of claim 1, wherein the composition format comprises a plurality of sub-formats, wherein each of the sub-formats match, search, and rank themselves.

3. The system of claim 2, wherein the plurality of sub-formats comprises a nested composite format and a building block.

4. The system of claim 1, wherein the composite format comprises a hierarchical structure of the sub-formats.

5. The system of claim 1, wherein the composition format comprises a concatenation of sub-formats.

6. The system of claim 1, wherein the composition format comprises a union of sub-formats.

7. The system of claim 1, wherein the rank-then-cipher generates a format-preserved mask corresponding to an encrypted index value of a composite ranking of the matched and validated occurrence.

8. The system of claim 1, wherein the rank-then-cipher generates format-preserved mask corresponding to a tokenized index value of a composite ranking of the matched and validated occurrence.

9. A computer-implemented method, comprising:
receiving, via a processor, a composite format and data;
generating, via the processor, regular expressions representing textual pattern facets of sub-formats, and a regular expression representing a composite textual pattern of the composite format based on sub-format and composition type;
searching, via the processor, the data using the generated regular expressions representing the composite textual pattern to detect an occurrence of a candidate match;
recursively matching and validating, via the processor, the detected occurrence with the composite format and hierarchically matching and validating sub-formats in the detected occurrence;
masking in place, via the processor, the matched and validated occurrence of the composite format in the data using a rank-then-cipher based format preserving masking; and
outputting, via the processor, masked data.

10. The computer-implemented method of claim 9, wherein generating the regular expressions comprises mapping each sub-format to respective text using capturing groups.

11. The computer-implemented method of claim 9, wherein recursively matching the detected occurrence with the composite format comprises matching a nested composite format within the composite format.

12. The computer-implemented method of claim 9, wherein matching the composite format comprises decomposing the detected occurrence to a sub-format matching using capturing groups and calling a match on each of the sub-formats with their respective sub-strings.

13. The computer-implemented method of claim 9, wherein validating the detected occurrence comprises validating an additional format restriction not represented in the textual pattern facets and the composite textual pattern.

14. The computer-implemented method of claim 9, wherein masking in place comprises replacing the matched and validated occurrence of the composite format in the data with an encrypted value or a token.

15. The computer-implemented method of claim 9, wherein the rank-then-cipher based format preserving masking comprises executing a composite ranking of the validated occurrence to generate an integer, executing an integer-encryption of the integer to generate an encrypted integer, and unranking the encrypted integer to generate a masked value for the validated occurrence.

16. The computer-implemented method of claim 9, wherein the rank-then-cipher based format preserving masking comprises a tokenization of the matched and validated occurrence.

17. The computer-implemented method of claim 9, further comprising validating a trained machine learning model using the output masked data as test data.

18. A computer program product for masking composite formats, the computer program product comprising a computer-readable storage medium having program code embodied therewith, wherein the computer-readable storage medium is not a transitory signal per se, the program code executable by a processor to cause the processor to:
receive a composite format and data;
generate regular expressions representing textual pattern facets of sub-formats of the composite format, and a regular expression representing a composite textual pattern of the composite format based on sub-format and composition type;
search the data using the generated regular expression representing the composite textual patterns to detect an occurrence of a candidate match;
recursively match and validate the detected occurrence with the composite format and hierarchically match and validate sub-formats in the detected occurrence;
mask in place the matched and validated occurrence of the composite format in the data using a rank-and-cipher format preserving masking; and
output masked data.

19. The computer program product of claim 18, further comprising program code executable by the processor to validate an additional format restriction not represented in the textual pattern facets and the composite textual pattern.

20. The computer program product of claim 18, further comprising program code executable by the processor to map each sub-format to a respective text using capturing groups.

* * * * *